(12) United States Patent
Boitnott

(10) Patent No.: US 7,277,795 B2
(45) Date of Patent: Oct. 2, 2007

(54) METHOD FOR ESTIMATING PORE STRUCTURE OF POROUS MATERIALS AND ITS APPLICATION TO DETERMINING PHYSICAL PROPERTIES OF THE MATERIALS

(75) Inventor: Gregory N. Boitnott, Hanover, NH (US)

(73) Assignee: New England Research, Inc., White River Jct., VT (US)

( * ) Notice: Subject to any disclaimer, the term of this patent is extended or adjusted under 35 U.S.C. 154(b) by 310 days.

(21) Appl. No.: 10/819,881

(22) Filed: Apr. 7, 2004

(65) Prior Publication Data

US 2005/0256643 A1  Nov. 17, 2005

(51) Int. Cl.
*G01V 1/40* (2006.01)
*G06G 7/48* (2006.01)

(52) U.S. Cl. .............................. 702/6; 703/10
(58) Field of Classification Search ............... 702/6, 702/11, 12, 13; 703/9, 10; 367/73; 73/152.18, 73/152.39
See application file for complete search history.

(56) References Cited

U.S. PATENT DOCUMENTS

| | | | | |
|---|---|---|---|---|
| 4,783,751 A * | 11/1988 | Ehrlich et al. | ................ | 702/11 |
| 5,193,059 A * | 3/1993 | Tiab et al. | .................... | 702/12 |
| 5,675,147 A * | 10/1997 | Ekstrom et al. | ............ | 250/256 |
| 6,842,725 B1 * | 1/2005 | Sarda | .......................... | 703/10 |
| 2002/0173915 A1 * | 11/2002 | Egermann et al. | ............ | 702/12 |
| 2003/0028325 A1 * | 2/2003 | Roggero et al. | .............. | 702/11 |

OTHER PUBLICATIONS

Blunt et al., Detailed Physics, Predictive capabilities and Macroscopic Consequences for Pore-Network Models of Multiphase Flow, 2002, Advances in Water Resources 25, pp. 1069-1089.*
Van Siclen, Equivalent Channel Network Model for Permeability and Electrical Conductivity of Fractured Networks, Jan. 1, 2002, Journal of Geophysical Research, vol. 107, No. B6.*
Kamath et al., Use of Pore Network Models to Interpret Laboratory Experiments on Vugular Rocks, 1998, Journal of Petroleum Science and Engineering 20, pp. 109-115.*
Taylor, S., et al; Incorporating mechanisms of fluid pressure relaxation into inclusion-based models of elastic wave velocities; Geophysics, vol. 68, No. 4; pp. 1173-1181; Jul.-Aug. 2003.

(Continued)

*Primary Examiner*—John Barlow
*Assistant Examiner*—Toan M. Le
(74) *Attorney, Agent, or Firm*—Richard A. Fagin

(57) ABSTRACT

A method is disclosed for modeling a pore structure of a porous material. The method includes generating an initial model of the porous material. The initial model includes an interconnected network of passages including a first geometric shape and a second geometric shape. At least one petrophysical property is calculated from the initial model. At least one geometric parameter in at least one passage of the first geometric shape is adjusted. The at least one petrophysical property is recalculated, and the adjusting and recalculating are repeated until a difference between the calculated petrophysical property and a measured petrophysical property reaches a minimum. In some embodiments, the adjusting and recalculating are repeated until an indeterminacy condition is satisfied.

44 Claims, 7 Drawing Sheets

OTHER PUBLICATIONS

Man, H. et al; Pore Network Modelling of Electrical Resistivity and Capillary Pressure Characteristics; Transport in Porous Media, Nov. 16, 1999; pp. 263-286, 2000; Kluwer Academic Publishers, Netherlands.

Doyen, P.; Crack Geometry in Igneous Rocks; Journal of Geophysical Research, vol. 92, No. B8, pp. 8169-8181, Jul. 10, 1987; Stanford, CA.

Boitnott, G. et al; Pore Space Inversion to Enhance Reservoir Characterization in a Porous Diagenetic Carbonate; Proceedings SCA 2001.

Bernabe, Y.; Pore Geometry and Pressure Dependence of the Transport Properties in Sandstones; Geophysics, vol. 56 No. 4 (Apr. 1991) pp. 436-336, Nov. 20, 1999.

Bernabe, Y.; The Transport Properties of Networks of Cracks and Pores; Journal of Geophysical Research, vol. 100, No. B3, pp. 4231-4241, Mar. 10, 1995.

Cheng, C. et al; Inversion of Seismic Velocities for the Pore Aspect Ratio Spectrum of a Rock; Journal of Geophysical Research, vol. 84 No. B13, Dec. 10, 1979.

Keehm, Y. et al; Permeability prediction from thin sections: 3D reconstruction and Lattice-Boltzmann flow simulation; Geophysical Research Letters, vol. 31, L04606, pp. 1-4, doi: 10.1029/2003GL018761, 2004.

Kazatchenko, M. et al; Joint modeling of acoustic velocities and electrical conductivity from unified microstructure of rocks; Journal of Geophysical Research, vol. 109, B01202 doi: 10.1029/2003JB002442, 2004.

Kachanov, M. et al; Explicit cross-property correlations for porous materials with anisotropic microstructures; Journal of the Mechanics and Physics and Solids 40 (2001) 1-25; Apr. 2000.

Knackstedt M. et al; Digital Core Laboratory: Properties of reservoir core derived from 3 D images; Society of Petroleum Engineers; SPE 87009, 2004.

Yale, D.; Network Modelling of Flow, Storage and Deformation in Porous Rocks; A dissertation submitted to the dept. of geophysics and the committee on graduate studies of Stanford University in partial fulfillment of the requirements for the degree of Doctor of Philosophy; Aug. 1984; pp. 1-140.

* cited by examiner

METHOD FOR ESTIMATING PORE STRUCTURE OF POROUS MATERIALS AND ITS APPLICATION TO DETERMINING PHYSICAL PROPERTIES OF THE MATERIALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of analysis of various physical properties of porous materials, including Earth formations. More specifically, the invention relates to methods for estimating pore structures of porous materials from selected petrophysical information, and using the estimated pore structures to infer other properties of the porous materials.

2. Background Art

Many materials, including Earth rock formations, are porous, meaning that some of the volume occupied by the rock formations has void spaces therein. Many porous materials are also permeable to the flow of fluids. Porous, permeable Earth formations, in particular, are widely explored for the presence of useful materials, such as petroleum. Exploration techniques known in the art for evaluating porous, permeable Earth formations beneath the Earth's surface include seismic surveying, flow testing and well logging, among others. Among the purposes for Such exploration techniques, particularly as applied to petroleum-bearing formations ("reservoirs"), is to assist in the prediction of fluid production from the Earth formations as the petroleum is withdrawn from subsurface reservoirs. Predictions of fluid production are useful in estimating how many wellbores may be needed to extract the maximum amount of producible petroleum from a particular reservoir, and the rates at which the petroleum will be produced, as well as rates at which connate fluids (typically water) will be produced from the reservoir. Such predictions are important in determining the economic value of a particular reservoir.

As is known in the art, fluid production is related to factors including the fraction of the pore space occupied by the petroleum and occupied by connate water (which typically occupies the remainder of the pore space) and the relative mobilities of the petroleum and the connate water. Relative mobility of a particular fluid is related to the fraction of the pore space occupied by the particular fluid, the viscosity of the particular fluid, and the capillary pressure behavior of the particular fluid within any particular porous material or Earth formation.

Capillary pressure behavior of a particular fluid is related to a great extent to the geometric structure of the pore space ("pore structure") in a porous material or Earth formation. Pore structure is related to factors including sizes, size distribution, shapes and chemical composition of the mineral grains ("matrix") forming the particular porous material or Earth formation. Methods known in the art for determining pore structure include micrographic (including image) analysis of "thin sections" of an Earth formation. A thin section is a representative sample of the formation cut or ground to a thickness typically less than 0.5 mm such that visible light will penetrate the sample for image analysis. It is also known in the art to measure capillary pressure behavior of particular porous materials or Earth formations by measurements of mercury injection pressure on actual samples ("cores") of the particular formation. It is also known in the art to correlate various classes of pore structures to capillary pressure behavior.

Irrespective of the method used to determine the capillary pressure behavior of particular porous materials, accurate determination of capillary pressure behavior using methods known in the art requires analysis of physical samples of the particular formations, whether the samples are thin sections, or core samples or the like. Obtaining samples of each particular formation which includes petroleum reservoirs is difficult and expensive. Further, it is well known in the art that physical properties of subsurface Earth formations vary, sometimes greatly, within a geographic volume (product of the areal extent and thickness) coextensive with a petroleum reservoir. Therefore, accurate prediction of capillary pressure behavior, and corresponding fluid production, from a particular reservoir using techniques known in the art would require large numbers of samples of the particular formation for analysis of the geometric distribution of capillary pressure behavior.

The previously described exploration techniques, namely seismic surveying and well logging, provide relatively rapid, volumetrically extensive estimates of the structure and composition of subsurface Earth formations. However, methods for estimating capillary pressure behavior from such exploration techniques have proven to be impractical.

One way to estimate capillary pressure behavior from seismic date and well log data known in the art is to model the pore structure of the subsurface Earth formations from other measurements of properties of the formation. One such modeling technique is described in, Doyen, P. E., *Crack geometry of igneous rocks: A maximum entropy inversion of elastic and transport properties*, J. Geophysical Research, v. 92, n. B8, pp. 8169-8181, (1987). Conceptually, the method disclosed in the Doyen reference includes generating an initial model of the Earth formation as a homogeneously distributed network of interconnected tubes. The tubes have an average length, average diameter and average aspect ratio. The tube variables are adjusted such that selected predicted physical properties of the particular rock most closely match corresponding measured properties of the formation.

The method disclosed in the Doyen reference has proven to be impractical when applied to typical petroleum-bearing formations. In particular, the Doyen method has not provided accurate predictions of a property known as the "formation factor" (a ratio of the electrical resistivity of the particular formation with respect to the resistivity of fluid filling the pore spaces).

What is needed is a method for accurately estimating pore structure of formations from data such as seismic surveying and well logs, such that capillary fluid pressure behavior and other pore structure related properties of porous materials, particularly subsurface Earth formations, may be accurately estimated using such data.

SUMMARY OF THE INVENTION

One aspect of the invention is a method for modeling a pore structure of porous materials. The method includes generating an initial model of the porous material. The initial model includes an interconnected network of passages, wherein the passages include a first geometric shape and a second geometric shape. In some embodiments, the initial model can be extended to include multiple pore systems, in a non-limiting example through the addition of microporosity and/or vugs, which are describable by additional networks and/or distributions of additional geometric shapes. At least one petrophysical property is calculated from the initial model. At least one geometric parameter of at least one passage of the first geometric shape is adjusted. The at least one petrophysical property is recalculated, and the adjusting and recalculating are repeated until a difference between the calculated petrophysical property and a measured petrophysical property reaches a minimum. In some embodiments of a method according to this aspect of the invention, the adjusting and recalculating are repeated until an indeterminacy condition is satisfied. In one embodiment, the adjusting and recalculating are repeated until an entropy of the model is maximized. In one embodiment, the minimizing the difference and maximizing the entropy are performed substantially simultaneously.

Another aspect of the invention is a computer program stored in a computer readable medium. The program includes logic operable to cause a programmable computer to perform the following. An initial model of a porous material is generated. The initial model includes an interconnected network of passages, wherein the passages include a first geometric shape and a second geometric shape. At least one petrophysical property is calculated from the initial model. At least one geometric parameter of at least one passage of the first geometric shape is adjusted. The at least one petrophysical property is recalculated, and the adjusting and recalculating are repeated until a difference between the calculated petrophysical property and a measured petrophysical property reaches a minimum. In some embodiments of a computer program according to this aspect of the invention, the adjusting and recalculating are repeated until an indeterminacy condition is satisfied. In one embodiment, the adjusting and recalculating are repeated until an entropy of the model is maximized. In one embodiment, the minimizing the difference and maximizing the entropy are performed substantially simultaneously.

Other aspects and advantages of the invention will be apparent from the following description and the appended claims.

BRIEF DESCRIPTION OF THE INVENTION

DETAILED DESCRIPTION

Figure 1:
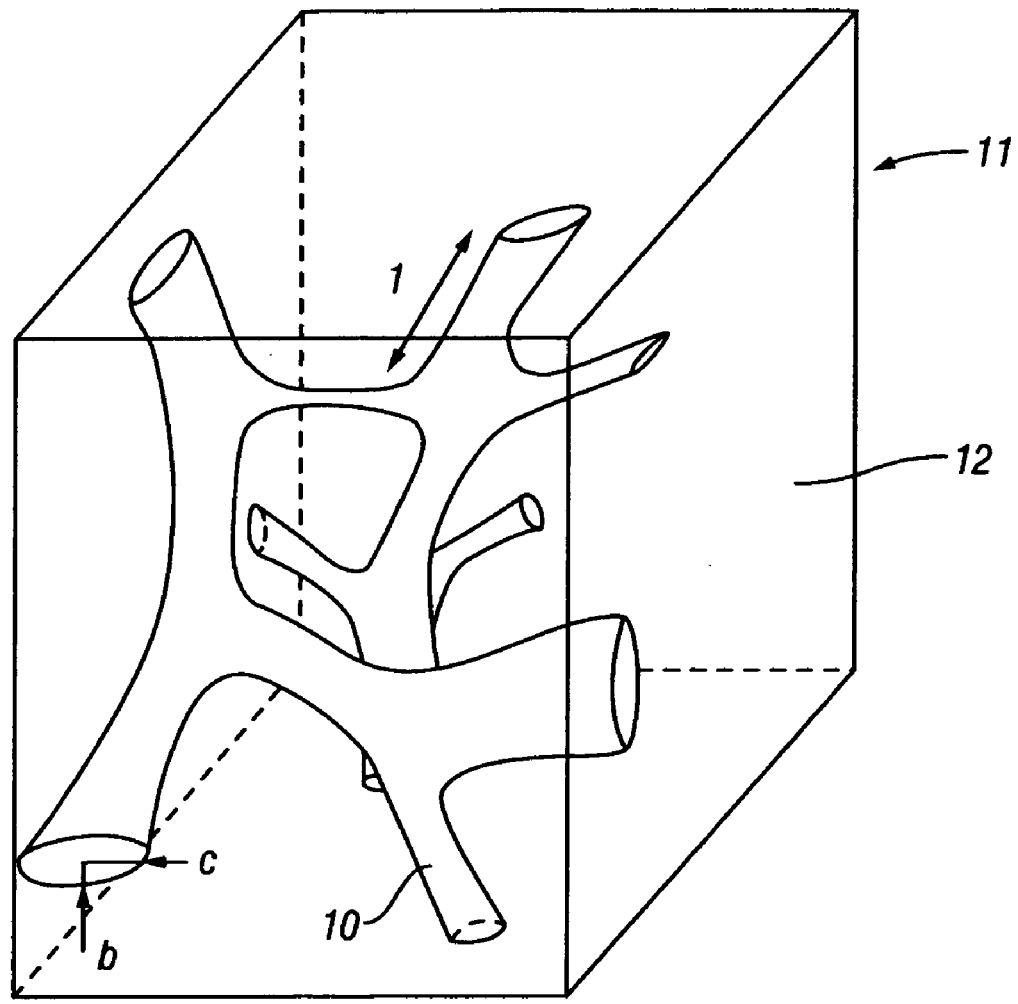
FIG. 1 shows a prior art model of pore structure.

In the most general sense, methods according to the invention provide a pore structure model which has calculable physical characteristics that most closely match corresponding measured physical characteristics of actual porous materials. The pore structure model may be used, in some applications, to estimate physical characteristics of Earth formations for which physical samples of the Earth formation, or measurements of the physical characteristics, are not available. Estimates of the physical characteristics or properties may be further used, in some embodiments, to predict fluid production behavior of subsurface fluid reservoirs, such as petroleum reservoirs. While the invention is described in terms of application to porous Earth formations, it should be understood that the invention is also applicable to analysis of other porous materials, whether natural or man-made.

Methods according to the invention include generating an initial pore structure model of a porous Earth formation (or other porous material). The initial pore structure model includes a spatially distributed collection of "nodes", which in some embodiments are substantially spherical, interconnected by a network of "tubes" (sometimes referred to as pore "throats"). The initial model includes rheological properties of the matrix material and geometric variables for the nodes, tubes, and network structure. A set of physical properties or parameters is calculated for the initial model, as will be further explained below, for example, total porosity, fluid permeability, formation resistivity factor (F), acoustic compressional wave velocity, acoustic shear wave velocity, NMR relaxation behavior, and mercury injection pressure characteristics (or capillary pressure behavior). The calculated physical parameters are then compared to measured corresponding parameters of an Earth formation intended to be represented by the pore structure model. The initial model is adjusted with respect to one or more selected geometric parameters of the network of nodes and tubes, and the calculated physical parameters are recalculated. The process continues until differences between the calculated physical parameters and the measured physical parameters are minimized. In some embodiments, minimizing differences may include that a set of inversion criteria are met which include a measure of the goodness of fit of the inversion to the measured data, and if needed, other measures to remove indeterminacy. At this point, a final model of the pore structure is obtained. The final modeled pore structure may then be correlated to various measurements of Earth formations, such as well log data and seismic surveys. The correlation may be used to estimate a different pore structure model when the measured petrophysical parameters change. The different pore structure may then be used, in some embodiments. to estimate capillary pressure behavior, as well as other petrophysical properties of the Earth formation, for places in which there are no physical samples of Earth formation.

The theoretical basis for a model of the pore structure of a porous Earth formation may be better understood by referring to FIG. 1, which shows a prior art model used to describe properties of an Earth formation 11 known as the "Westerly Granite." See, Doyen, P. E., *Crack geometry of igneous rocks: A maximum entropy inversion of elastic and transport properties*, J. Geophysical Research, v. 92, n. B8, pp. 8169-8181, (1987). The Westerly Granite is an igneous (solidified from molten Earth minerals) rock that after solidification was later subjected to tectonic forces and other physical and chemical processes which induced rock material failure and/or modified the pore space of the material. The rock material failure resulted in void spaces in the formation known in the art as "fractures." The prior art model consists of a randomly distributed, interconnected network of tubes 10. The tubes 10 have an average length represented by l and an elliptical cross-section represented by half the long axis c and half the short axis b. An aspect ratio (b/c) for each tube 10 may be defined by the variable a. The tubes 10 may be distributed in size around either or both the mean length l and half axes b, c. It is within the scope of the invention to use any distribution, for example Gaussian, about the mean values. The tubes 10 may also be modeled as having effectively a single length, being the mean length l, and a single set of size/aspect ratio definitions. The tubes 10 may be randomly distributed and randomly oriented, however at the macroscopic scale (more than about 100 times the average length l) the network of interconnected tubes 10 acts substantially as a homogeneous, isotropic medium. The degree of interconnection between the tubes 10 in the model may be defined by an average coordination number Z. The solid material 12 of the modeled Earth formation (known in the art by the term "matrix") is assumed to be describable by a material model which, in combination with the description of the pore space, can be used to define the deformation of the pore space as a function of environmental influences such as stress and/or temperature. In one embodiment of the invention, the matrix 12 is assumed to be a substantially homogeneous and isotropic linearly elastic material having elastic properties known as Young's modulus E and Poisson's ratio v. The dimensions of the tubes 10 will thus be dependent on the ambient external ("confining") pressure, represented by P. The following expressions enable calculation of the pressure dependent dimensions of the tubes 10:

$$C(p; \alpha, c) = \frac{1}{2}(c+b)\exp\left\{\frac{-(1-v)P}{G}\right\} + \frac{1}{2}(c-b)\exp\left\{\frac{(1-v)P}{G}\right\} \quad (1a)$$

$$B(p; \alpha, c) = \frac{1}{2}(c+b)\exp\left\{\frac{-(1-v)P}{G}\right\} - \frac{1}{2}(c-b)\exp\left\{\frac{(1-v)P}{G}\right\} \quad (1b)$$

Other expressions suitable for calculating the pressure dependent geometry of other tube geometries and matrix material models may be substituted in alternative embodiments of the invention.

The fractional volume of pore space (porosity) in the modeled formation, represented by $\phi$, and the bulk (macroscopic or "core scale") formation compressibility, $\beta$, may be calculated as expressions of the probability distribution functions of the tube shapes, represented by $n(\alpha, c)$, as shown in equations (2) and (3) below:

$$\phi = \pi N_v l \sum_{\alpha,c} n(\alpha, c) B(p; \alpha, c) C(p; \alpha, c) \quad (2)$$

$$\beta = \beta_s + \frac{2\pi(1-v^2)}{E} N_v l \sum_{\alpha,c} n(\alpha, c)(C^2(p; \alpha, c) + B^2(p; \alpha, c)) \quad (3)$$

where $N_v$ represents the number of tube elements per unit volume and $\beta_s$ represents the compressibility of the matrix material. $N_v$ may be calculated by the expression $Z/(2l^3)$. Typically, the range of aspect ratio $\alpha$ will be within a range of 1.0 (circular cross-section) to about 0.0001 (thin slit-like features).

The electrical and hydraulic conductance of individual ones of the tubes 10, represented by $g_e$ and $g_h$, respectively, may be calculated by the following expressions:

$$g_e(p; \alpha, c) = \sigma_f \frac{\pi BC}{l} \quad (4a)$$

and $$g_h(p; \alpha, c) = \frac{\pi}{4l} \frac{B^3 C^3}{B^2 + C^2} \quad (4b)$$

B and C in equations (4a) and (4b) are the pressure dependent dimensions of the tubes 10 determined as explained with reference to equations (1a) and (1b).

The formation resistivity factor F and the permeability of the formation to movement of fluid, represented by k, can be calculated by the following expressions based on the above calculated electrical and hydraulic conductances:

$$1/F \equiv \frac{\sigma_e}{\sigma_f} = \frac{1}{3} N_v l^2 g_e^* \quad (5a)$$

$$k = \frac{1}{3} N_v l^2 g_h^* \quad (5b)$$

where $\sigma_f$ in equations (4a) and (5a) represents the electrical conductivity of fluid in the pore space of the formation. The electrical and hydraulic conductances used in equations (5a) and (5b), respectively are solutions to self-consistency conditions enforced by the implicit equations:

$$\sum_{\alpha,c} n(\alpha, c) \frac{g_e^* - g_e(p; \alpha, c)}{g_e(p; \alpha, c) + \left(\frac{Z}{2} - 1\right) g_e^*} = 0 \quad (5c)$$

$$\sum_{\alpha,c} n(\alpha, c) \frac{g_h^* - g_h(p; \alpha, c)}{g_h(p; \alpha, c) + \left(\frac{Z}{2} - 1\right) g_h^*} = 0 \quad (5d)$$

The constraining equations (2, 3 and 5a through 5d) may be rewritten as sums over the shape spectrum in the form:

$$\sum_{\alpha,c} n(\alpha, c) A(\alpha, c, p) = 0 \quad (6)$$

in which A ($\alpha$, c, p) is in a different form for each modeled physical property and p represents the pressure of the individual constraint.

It is frequently the case that a set of constraining equations is not unique. It has been determined that quality of the result is improved by adding an additional constraint such that the solution of the shape spectrum has maximum entropy. The entropy of the shape spectrum may be defined by the following expression:

$$S[n(\alpha, c)] = -\sum_{\alpha,c} n(\alpha, c) \ln[n(\alpha, c)] \quad (7)$$

Therefore the solution to the shape spectrum is obtained when the following objective function is minimized:

$$f(\lambda_{p_1}, \lambda_{p_2}, \ldots, \lambda_{p_n}) = \ln\left[\sum_{\alpha,c} \exp\left\{-\sum_p \lambda_p A(\alpha, c, p)\right\}\right] \quad (8)$$

and the shape spectrum of the final resulting model having maximum entropy and maximum correspondence between the modeled physical parameters and the actual modeled parameters is provided by the expression:

$$n(\alpha, c) = \frac{\exp\left\{-\sum_p \lambda_p A(\alpha, c, p)\right\}}{\left[\sum_{\alpha,c} \exp\left\{-\sum_p \lambda_p A(\alpha, c, p)\right\}\right]} \quad (9)$$

The foregoing model of pore space is defined by a network of interconnected passages having a first geometric shape, which in the present embodiment is in the form of tubes of elliptical cross section. Tubes of this geometry are used because of the relative simplicity of calculating parameters based on average length and average aspect ratio. It should be understood that other shapes may be used for the first geometric shape of passages, including rectangular cross-section passages. It should also be understood the non-uniform or irregular shapes may be used for the first geometric shape of passages, including passages with shapes which may vary regularly, irregularly, or stochastically with position within the passage.

The model technique shown in FIG. 1 and explained with reference to equations (1a) through (9), has proven limited in its ability to accurately predict physical properties of porous materials, particularly when applied to "sedimentary" Earth formations. Sedimentary Earth formations are formed by deposition of Earth materials, where the materials have been previously eroded from some other Earth formation by the action of wind and/or water. Deposition may occur when wind and/or water velocity is insufficient to suspend particles of the eroded Earth materials, or when materials precipitate from solution in water. Pore space of deposited material may be further modified by environmental influences such as stress, temperature, and chemical alteration, commonly referred to as "diagenesis."

Figure 2:
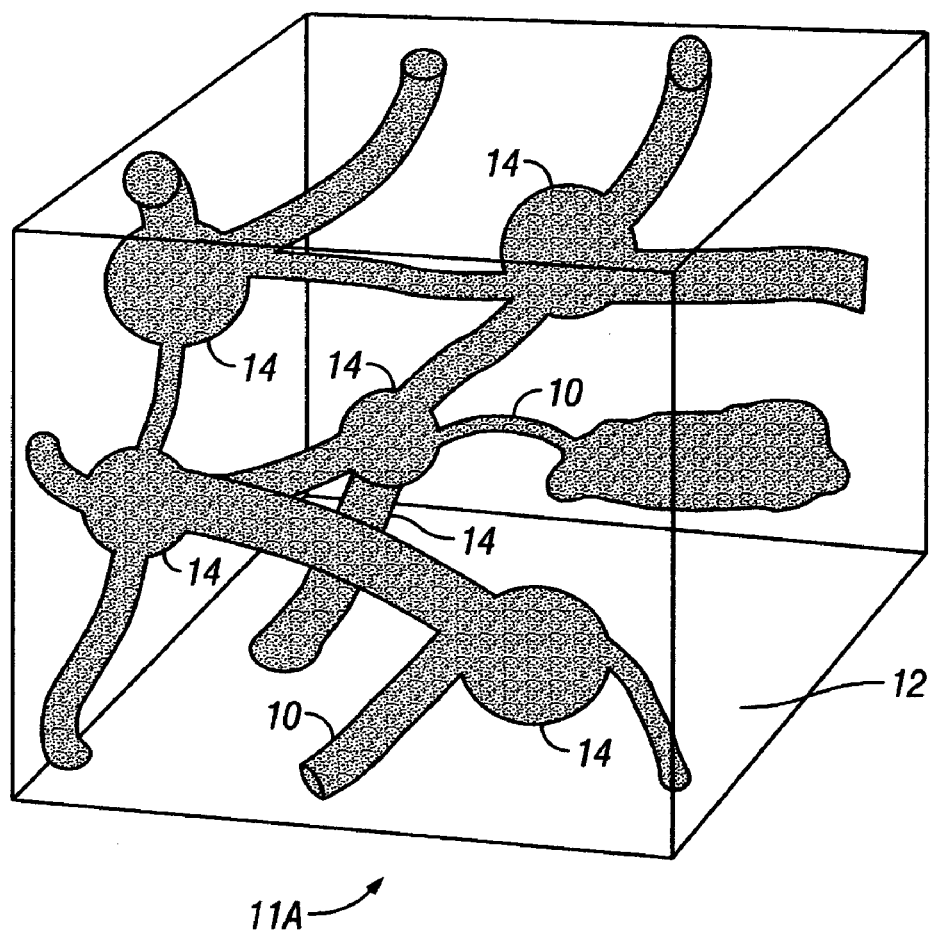
FIG. 2 shows one embodiment of a pore structure model according to the invention.

It has been determined that the ability of the model of FIG. 1 to predict certain properties of Earth formations may be improved substantially, particularly with respect to prediction of MICP (mercury injection capillary pressure) characteristics, NMR response, and to simultaneously satisfy permeability k and formation factor F of the Earth formation, among other benefits. Such improvement is obtained by modifying the model of FIG. 1 to include, at each juncture of two or more of the first-shape (tube) passages, a passage (or pore element) referred to as a "node", and having a second selected geometric shape. In one embodiment, the nodes are substantially spherical, and are assumed to have substantially no effect on the transport properties (permeability and resistivity factor) of the porous Earth formation. FIG. 2 shows an example of a model porous Earth formation 11A including an interconnected network of nodes 14 and tubes 10. The nodes 14 are modeled as randomly distributed throughout the porous formation 11A and each is positioned at the junction of two or more of the tubes 10.

The average radius $r_n$, of the nodes 14 (when modeled as spheres) is determined based on knowledge or assumptions concerning the distribution of the sizes of the nodes. In one embodiment the average radius $r_n$, is assumed to be equivalent to the radius of a sphere which, if present at every one of the nodes 14 would occupy the total volume of all the nodes, this total volume being represented by $V_n$. The nodal porosity, represented by $\phi_n$, is represented by the expression: $\phi_n = V_n/l^3$, such that:

$$r_n = \left[\frac{3}{4}\frac{\phi_n l^3}{\pi}\right]^{1/3}$$

For other embodiments which include an explicit definition of the distribution of r, a suitable equation is used to relate $r_n$ to $\phi_n$.

The mean length of the tubes 10 will be related to the mean radius of the nodes 14 by the expression:

$$l_t = l - 2r_n$$

Because the nodes 14 in some embodiments are assumed to have substantially no effect on the transport properties of the Earth formation, the formation factor F and the fluid permeability k may be estimated by the following expressions relating only to the average length of the tubes 10:

$$1/F = \frac{\pi Z r^2}{6 l l_t} = \frac{\phi_t l^2}{3 l_t^2} \quad (10a)$$

$$k = \frac{\pi Z r^4}{48 l l_t} = \frac{\phi_t^2 l^5}{12 \pi Z l_t^3} \quad (10b)$$

In embodiments in which the nodes 14 are assumed to have substantially no effect on the transport properties of the modeled Earth formation, the physical property modeling functions related to the tubes 10, as explained with reference to equations (1a) through (9) may be imported directly into a model which includes nodes 14. The tube porosity $\phi_t$ and tube compressibility $\beta_t$ may thus be represented by directly substituting into equations (2) and (3) above, as shown in equations (10) and (11).

$$\phi_t = \pi N_V l_t \sum_{\alpha,c} n(\alpha, c) B(p; \alpha, c) C(p; \alpha, c) \quad (11)$$

$$\beta_t = \frac{2\pi(1-v^2)}{E} N_V l_t \sum_{\alpha,c} n(\alpha, c)(C^2(p; \alpha, c) + B^2(p; \alpha, c)) \quad (12)$$

Compressibility of the nodes 14 may be determined, in some embodiments, using a theory developed by G. Kuster and N. Toksoz in, *Velocity and attenuation of seismic waves in two-phase media: Part I, Theoretical formulations*, Geophysics, v. 39, n. 5, pp. 587-618, Society of Exploration Geophysicists (1974) as shown in the following expression:

$$\beta_n = \frac{\left(1 + \frac{3\phi_n K_s}{4G_s}\right)}{K_s - \phi_n K_s} \quad (13)$$

in which $K_s=1/\beta_s$, and $G_s$ represents the shear modulus of the matrix 12, and can be calculated by: $G_s=E/(2-2v)$. In some embodiments, it is assumed that compressibility in the nodes 14 does not affect compressibility in the tubes 10, and vice versa. As a result, the total compressibility of the modeled formation 11A may be expressed simply as the sum of the node compressibility and the tube compressibility:

$$\beta=\beta_n+\beta_t \quad (14)$$

It will be appreciated that when the nodal porosity is zero, then $l_t=1$, and equation (14) will be consistent with equation (3). It will also be appreciated by those skilled in the art that as the amount of nodal porosity increases with respect to the total porosity, the average length of the tubes 10 decreases, which will result in changes in the shape characteristics of the tubes 10 and changes in fluid transport properties of the modeled Earth formation 11A.

Other embodiments may model the nodes 14 as other than spherical in shape. Example of other shapes include ellipsoids having three distinct average axial lengths, a, b, c. Such ellipsoids may also be expressed with respect to one axial length and two aspect ratios: a; $\alpha_1$, $\alpha_2$ where $\alpha_1=b/a$ and $\alpha_2=c/a$. It will be appreciated by those skilled in the art that while spherical nodes (both aspect ratios=1.0) are modeled such that they have substantially no effect on the transport properties of the formation, modeling nodes having narrow ellipsoidal shapes may require modeling the nodes such that they have at least some effect on transport properties. It should also be understood that the second geometric shape (for the nodes) is not limited to ellipsoids, but may be any other shape whose volume and surface area properties may be calculated.

Other embodiments may model the geometry of the network with structural correlation, using either isotropically or anisotropically distributed correlations with respect to any or all of the geometric shape factors describing the nodes and/or tubes, provided that suitable changes to the mathematical treatment of such heterogeneities and their effects on the material properties can be described. Such embodiments include additional geometric parameters which can be used in a manner similar to the length scale l and coordination number Z. Other embodiments may model the matrix material properties both with respect to heterogeneous, anisotropic, and/or otherwise spatially variable distributions, and with respect to material models other than linear elastic (such as viscoelastic and/or plastic), provided suitable changes to the mathematical treatment of deformation of the pore elements can be described. Other embodiments may model the electrical properties of the matrix (or portions of the matrix) as electrically conductive, provided suitable change to the underlying model of macroscopic electrical conduction can be described.

In embodiments of a method according to the invention, the inversion process described with reference to equations (8) and (9) may be performed using different values of fraction of nodal porosity, defined as $\phi_n/\phi$, until the modeled (calculated) physical parameters most closely match measured physical parameters for an Earth formation intended to be represented by the model.

Figure 3:
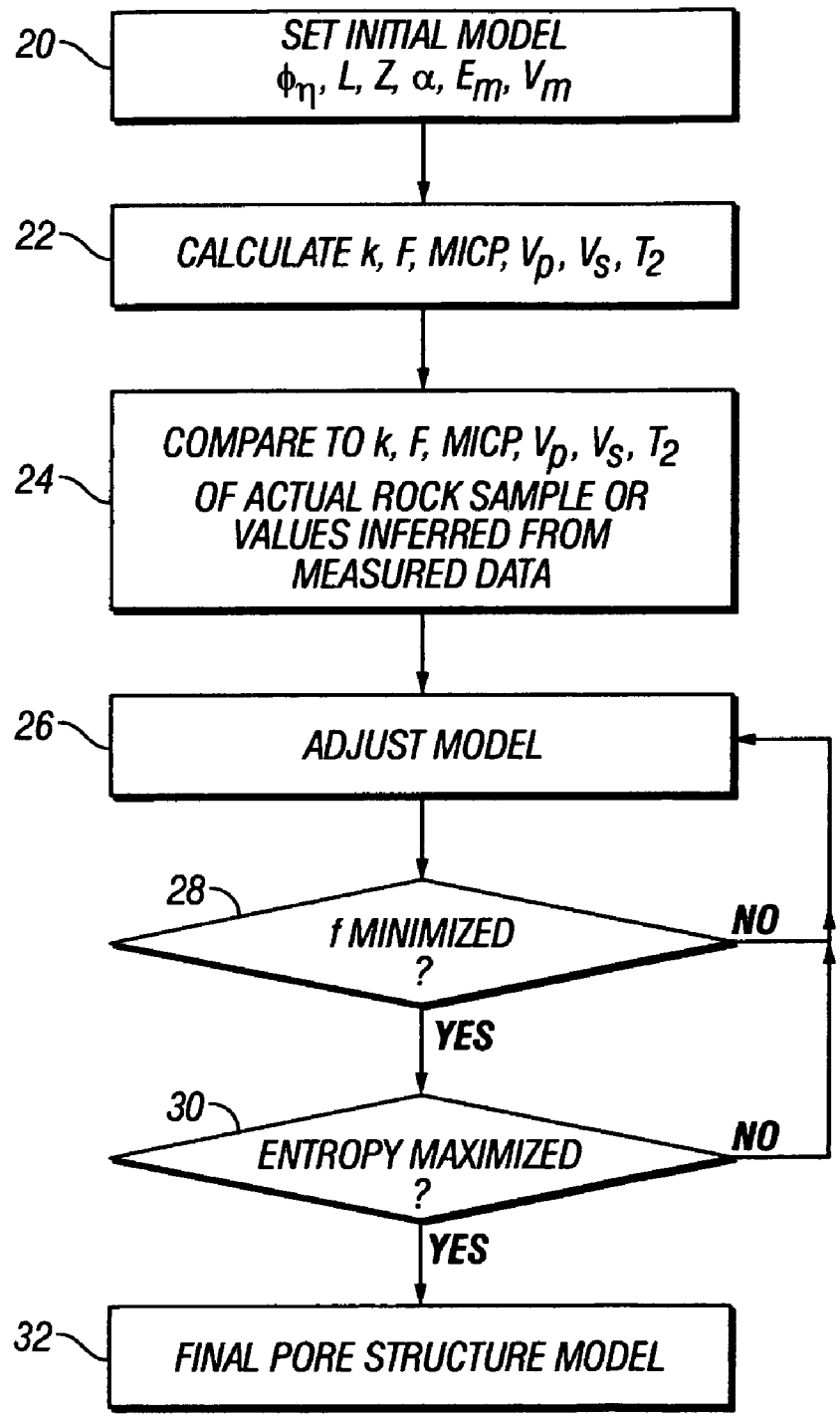
FIG. 3 shows a flow chart of one embodiment of a method according to the invention.

One embodiment of a method according to the invention is shown in a flow chart in FIG. 3. At 20, an initial model of the Earth formation is set. The initial model may include a fraction of nodal porosity, an average length, an average coordination number, an average aspect ratio for the tubes (10 in FIG. 2), and Young's modulus and Poisson's ratio for the matrix (12 in FIG. 2). As explained with reference to equations (10) through (12), at least one, and preferably several, physical properties of the Earth formation thus modeled are calculated, as shown at 22. Calculated properties may include permeability, formation resistivity factor, MICP behavior, compressional wave acoustic velocity, shear wave acoustic velocity, and nuclear magnetic resonance (NMR) relaxation (shown as T2 in FIG. 3) distribution. Other properties may be calculated using methods known in the art. The calculated properties are then compared, at 24, to any available data on the Earth formation to be modeled, including one or more measurements of the foregoing properties that had been calculated. In instances where actual samples of the modeled Earth formation are present, MICP behavior may be measured and used as part of the comparison. The comparison may be determined at a single confining pressure, or at a plurality of confining pressures, depending on the particular Earth formation being modeled, and whether actual samples are available. At 26, if differences exist between the calculated properties and the measured properties, the model is adjusted. Adjustment of the model in some embodiments includes changing one or more of the geometry parameters in the initial model, including the average length of the tubes (10 in FIG. 2), the average aspect ratio of the tubes, the nodal porosity fraction and the average coordination number. Other embodiments may include adjusting the aspect ratio, diameter and/or length of the tubes individually. After adjusting the model, the one or more physical properties are recalculated, and at 28, determination is made as to whether the inversion criteria are satisfied differences between the calculated properties and the measured properties are minimized. In one embodiment, such minimization is performed by minimizing an objective function, as explained with reference to equation (8). If the differences are minimized, at 30, a determination is made as to whether the geometric parameters of the model result in maximum entropy, as explained with reference to equation (9). At 32, the pore structure model is essentially finalized for the particular Earth formation when maximum entropy and minimum differences are reached. In the present embodiment, maximum entropy and minimum differences are determined in a single inversion process, as can be inferred from equation (9).

In many practical applications of the invention, the various constraints on the model may be insufficient to define a unique result based on minimizing a difference between at least one calculated petrophysical property and at least one measured petrophysical property. This condition is commonly known as indeterminacy. In the above implementation of the invention, the entropy of the model based on the first geometric shape (tubes) is used as a measure of the likeliness of the model, and the result is determined by repeating the adjusting the model and recalculating the expected petrophysical measurements until both the difference with respect to the constraints is minimized and the entropy of the result is maximized. Other implementations of the invention may apply measures or conditions other than entropy to remove the indeterminacy, such as choosing the result which minimizes the mean size of the passages in the network to find the solution with the smallest (on average) passages, or maximizing the mean aspect ratio to find the solution which is most "tube like".

Figure 4:
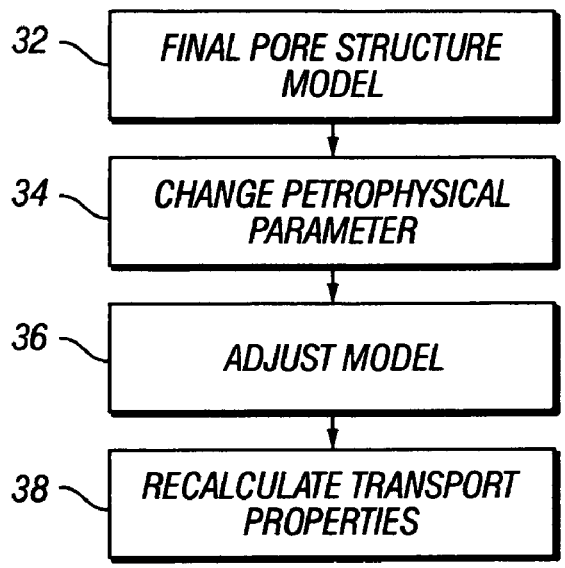
FIG. 4 shows one application of a pore structure model determined by a method according to the invention to determine petrophysical properties of an Earth formation where no physical sample is available.

Application of a pore structure model thus determined may be applied, in some embodiments, to determine one or more petrophysical parameters for Earth formations having no available physical sample for evaluation, or in cases where certain physical evaluation of the sample is not available or accessible. Referring to FIG. 4, the final pore structure model, determined as explained with reference to FIG. 3, at 32 in FIG. 4, is used as a starting point in the process. At least one petrophysical parameter is changed, at 34. Changing one or more petrophysical parameters, in some embodiments, includes changing one or more of the confining pressure, the rheological properties of the matrix, the permeability or the formation resistivity factor, where data to support such changes are available. Examples of data supporting changing the confining pressure include estimating formation properties at a depth in the Earth different from the formation depth corresponding to the final model. Changing the depth changes the weight of "overburden" atop the modeled formation and thus changes the confining pressure. An example of changing formation resistivity factor includes having data available for total porosity of the modeled formation, such as from well logs, and measurements of the so-called "wet" resistivity (resistivity of a rock completely saturated with brine) and resistivity of connate water filling the pore spaces of a "wet" formation. At 36, the model is adjusted by changing one or more geometry parameters of the modeled formation, as explained earlier with reference to FIG. 3, and finally, at 38, transport properties of the adjusted modeled formation are calculated.

Figure 5:
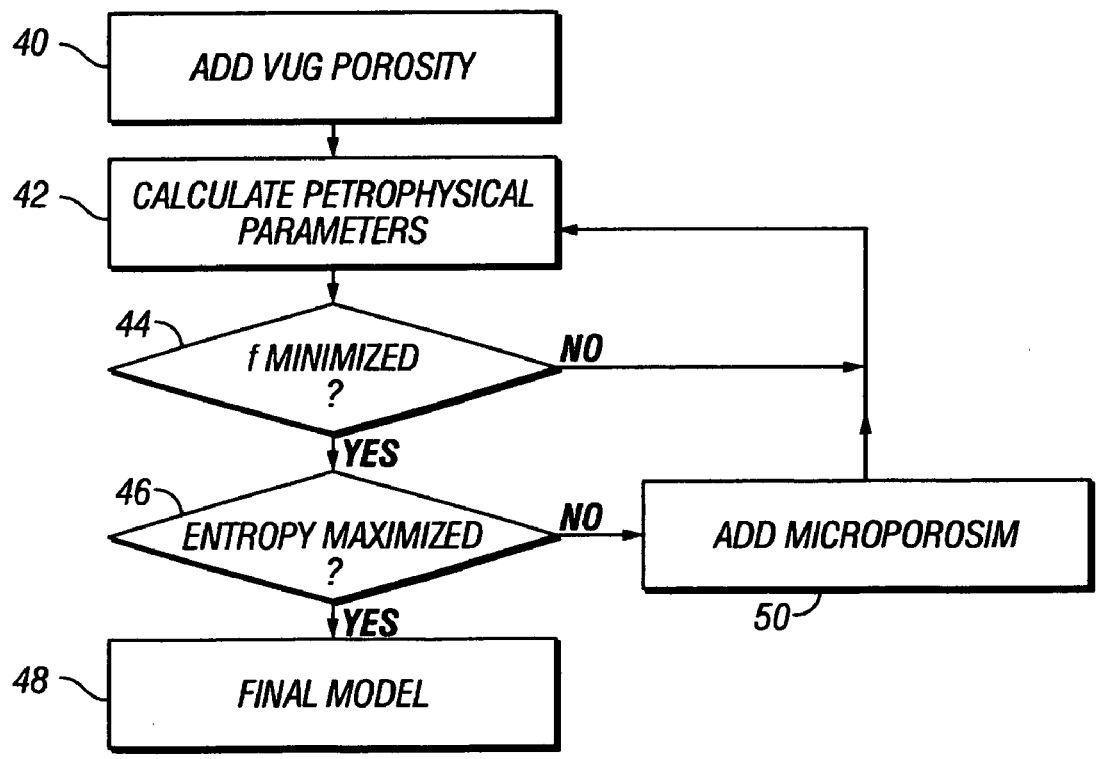
FIG. 5 shows another embodiment in which porosity not related to a network of tubes and nodes is included.

The modeling method explained above has proven accurate, particularly in Earth formations where the pore spaces constitute so-called "primary" porosity. Primary porosity is known in the art as pore space remaining within a sedimentary formation after the sediment is deposited, ant not caused by other post-depositional processes. It is known in the art that other types of pore spaces (called "secondary porosity") exist in Earth formations which occur as a result of one or more processes. Such processes include, for example, dissolving of minerals or objects in the formation due to action of water, stress-induced failure (fracturing), action of small living organisms, among others. It is known in the art that secondary porosity is often not hydraulically interconnected with primary porosity and/or is physically distinct with respect to its influence on material properties owing to the fact that some or all of its geometrical attributes are distinct from those of the primary porosity. It is also known that multiple types of secondary porosity (as well as multiple types of primary porosity) may reside in a single material, and thus must be modeled simultaneously. As a result, some petrophysical parameters, including acoustic velocities and capillary pressure behavior, may not be modeled accurately in the presence of secondary porosity. FIG. 5 shows another embodiment of a method according to the invention in which effects of secondary porosity may be used to improve the ability of the model to predict petrophysical properties of Earth formations.

At 40, "vug" porosity may be added to an initial model. Vug porosity may be represented, in some embodiments, by inclusions of a third geometric shape (which in some embodiments may be spherical) in the matrix (12 in FIG. 2) which are not modeled as an integral part of the network of nodes and tubes. Vugs may be represented by randomly distributed inclusions having a distribution of shapes which contribute to the material properties as described by models similar to those used previously for nodes, but not impacting network geometric parameters as in the case of nodes. The fraction of vug porosity and the compressibility of the vugs will be affected both by the total amount of vug porosity and by the average vug shape distribution.

After inclusion of the vugs, at 42 petrophysical parameters are calculated using, for example, the methods discussed with reference to equations (10a) through (14). At 44, differences between the calculated parameter and measured petrophysical parameters are determined, and whether such differences have reached a minimum, as explained with reference to equation (8). At 46, a determination is made as to whether the geometric parameters result in maximum entropy, as previously explained with reference to equation (9). If both minimum difference and maximum entropy are determined to exist, the model is finalized, as shown at 48. In the present embodiment, the inversion is structured so as to determine minimum differences and maximum entropy in a single inversion operation, as explained above with reference to equation (9).

In some cases, there may also be "microporosity", in which case addition of vug porosity may not result in maximum entropy and minimized differences. In one implementation of the invention, the microporosity may form a secondary network. At 50, a secondary network of microporosity may be included in subsequent iterations of the model. In one embodiment, the geometry of the microporosity network may take the form of tubes and nodes, as explained with reference to FIG. 1, and equations (1a) through (9). The microporosity network effects are thus added to the effects of the primary tube and node network through the use of a mixing model which defines, separately for each material property, how the two pore systems interact, and may be independent of the tube and node network. The model procedure is then repeated, at 42 through 46 until maximum entropy and minimum differences are determined.

Figure 6:
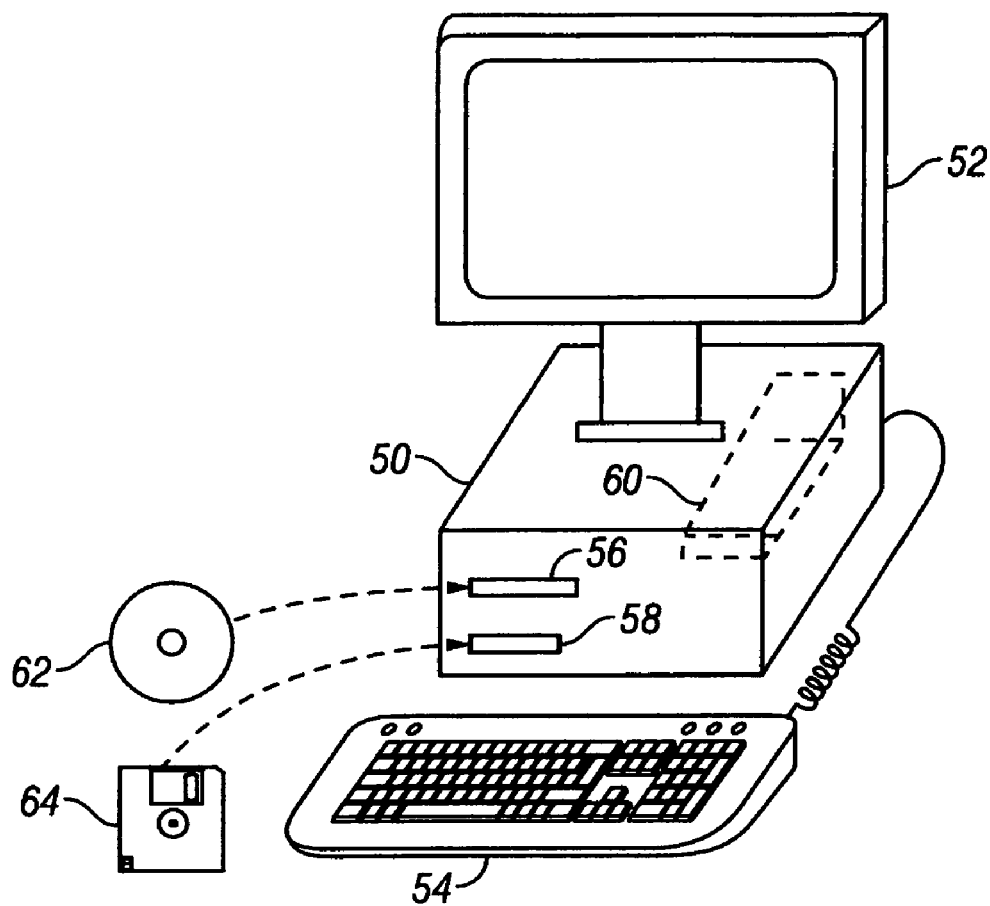
FIG. 6 shows a programmable computer used to read a program stored in a computer readable medium.

In another aspect, the invention relates to computer programs stored in a computer readable medium. Referring to FIG. 6, the foregoing process as explained with respect to FIGS. 3 through 5, can be embodied in computer-readable code stored on a computer readable medium, such as floppy disk 68, CD-ROM 70 or magnetic hard drive 66 forming part of a general purpose programmable computer. The computer, as known in the art, includes a central processing unit 60, a user input device such as a keyboard 62 and a user display 64 such as a flat panel LCD display or cathode ray tube display. According to this aspect of the invention, the computer readable medium includes logic operable to cause the computer to execute steps as set forth above and explained with reference to FIG. 3 through 5.

Figure 7:
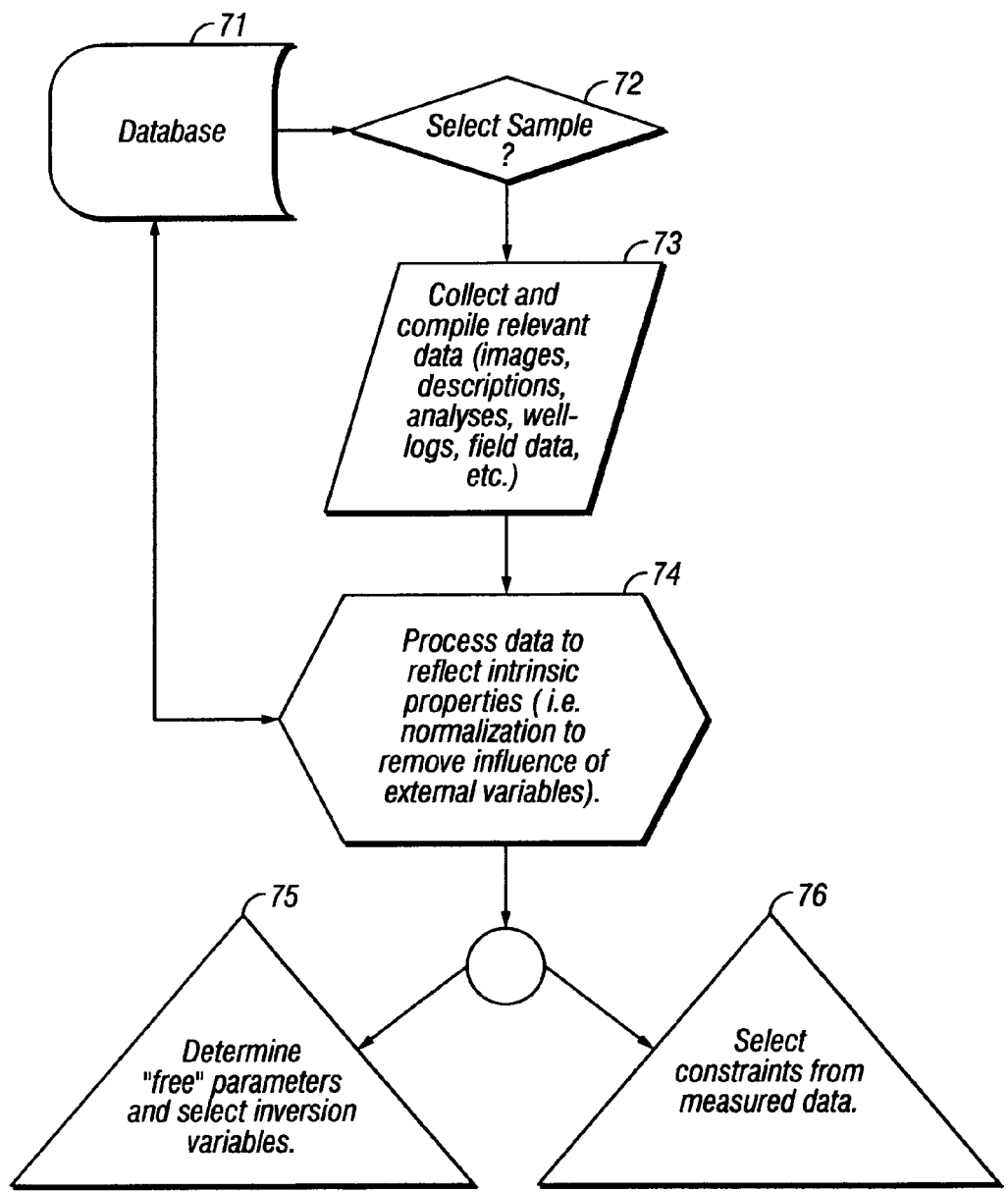
FIG. 7 shows a flow chart of an example implementation of a method according to the invention using different types of measurements to constrain the inversion process.

A practical implementation of a method according to the invention will now be explained with reference to FIG. 7. As will be readily appreciated by those skilled in the art, the speed and accuracy of any model inversion is improved by constraining both the initial model and the final model to exclude results which do not or cannot represent real Earth formations, or for which measurements dictate certain results with respect to one or more physical parameters. At 71, a database may be accessed by the computer (FIG. 6). The database may include various raw data. The raw data may include images of thin sections, measurements of various petrophysical parameters, as well as measurements of MICP behavior for selected Earth formations. The database may also include processed data, including results from modeling step 74. Information in the database may be used to constrain the initial model (20 in FIG. 3).

At 72, data from one or more core samples, if available, may be interactively selected, either by selecting a known sample by a unique identification number, by browsing an image database, or by interactively selecting points in crossplots between measured and/or assigned parameters tabulated from core measurements, well-logs, and/or other field data. The results for the selected sample may be presented, at 73, in a set of graphs, images, and/or descriptions which enable comparison of the selected sample with other samples, as well as with theoretical and empirical models that enable inference as to which physical parameters affect or are correlated to selected petrophysical properties. The core selection results may also be used, at 74, to infer limits on pore structure parameters used in the initial model (20 in FIG. 3), and/or estimates of what pore types and/or elements should be included in the initial model (20 in FIG. 3).

Data from the one or more selected images may then be used to identify pore space and matrix in the sample(s), and to perform image analysis to constrain an image based estimate of porosity, mean distance between pore bodies, and surface area to volume ratio of imaged porosity. The one or more sample images may also be used to infer the existence of anisotropy in the pore structure, and may also be used to identify and quantify non-network porosity, such as vugs, molds, fractures, etc. In one implementation, image porosity is subtracted from measured porosity (measurements such as from well logs or mercury injection) to infer microporosity, porosity heterogeneity, and/or features which may be present by not being visually observable in the image(s). Velocities and densities of the sample are used to calculate elastic constants. Resistivity data are normalized to obtain formation factor (through an appropriate model for the rock and pore fluid). NMR relaxation time distributions are normalized with respect to total porosity of the sample(s). Models identified as relevant may be applied to predict possible constraints (e.g. applying a model which predicts mercury injection curves based on porosity and permeability).

The information obtained at 74 may be used to guide selection of inversion parameters, at 75. For example, average tube length scale l can be inferred from image analysis or by applying network theory (tubular throats and spherical nodes) to porosity, permeability, and formation factor data to determine a first estimate of the length scale of an equivalent homogeneous network of tubes and nodes. Access to image processing software may be provided to enable the user to customize and specify the use of any image derived properties. Conflicts between different predictions of the same parameters may be identified and possible causes that impact the choice of free parameters and/or model variables are indicated. In some implementations the user may be queried to define the limits of the solution space (i.e. what are the minimum and maximum sizes of the tubes, what tube shapes or aspect ratios are to be used, and what range of shape factors is used). In some implementations the user may be queried to specify non-network porosity types present, including attributes, volumetrics and how they are to be used in the inversion process. In some implementations, the user may be queried to choose a rheological model for the matrix material, either based on mineralogy (chemical composition of the matrix) or empirical models applied to the available data (and related database at 71). In some implementations, the user may be queried as to what inversion methodology to use, what to do with conflicting constraints, and what "soft constraints" to apply after the inversion is completed.

In some implementations, at 76, the user may be provided with processes to select individual constraints for the inversion. Constraints as used in this description are measured properties that are sensitive (either in whole or in part) to the distribution of sizes and shape factors of the pore throats (tubes). These measured properties may include but are not limited to dynamic bulk modulus, formation resistivity factor, permeability, surface area to volume ratio, mercury injection behavior, and NMR relaxation properties. Data used as constraints can be pre-processed by petrophysical models to enable extraction of a pore stricture constraint from data that is influenced by other effects. For example, in the case of NMR, the application of a model to account for microporosity diffusion effects; or in the case of mercury injection, the application of percolation theory to relate the main inflection point as indicative of the effective radius at percolation, which can be used as a direct constraint to the inversion process.

Figure 8:
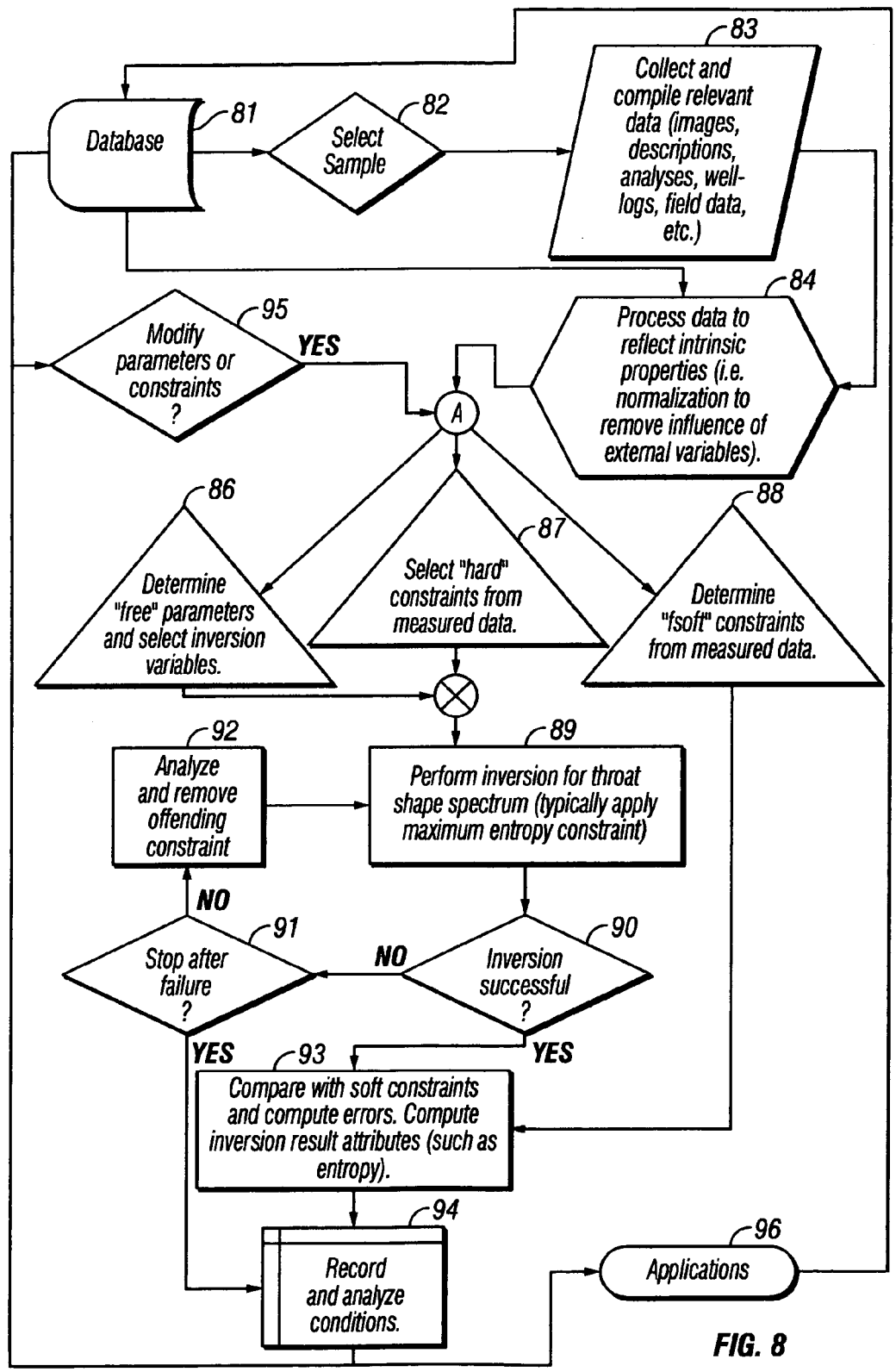
FIG. 8 shows a flow chart of another example implementation of a method according to the invention.

Another implementation is explained with reference to the flow chart in FIG. 8. A database, at 81, can include unprocessed petrophysical data, which may include images of core samples, well logs, seismic velocities, along with processed data that may include results from normalization at 84, as well as inversion and application results.

At 82, samples can be selected interactively by the system user, either by selecting a known sample by identification number or code, by browsing an image database, or by interactively selecting points in crossplots between measured and/or assigned parameters tabulated from core measurements, well-logs, and/or field data.

At 83, the results for a particular sample may be viewed by the system user as a set of graphs, images, and/or descriptions which enable quantitative and/or visual comparison of the selected sample with other samples. The selected sample may also be evaluated using theoretical and/or empirical models for selected parameters that are related to selected petrophysical properties. Such models may also establish reasonable limits on pore structure parameters, and/or estimates of what pore types and/or fundamental pore structure elements should be included in a model of pore structure.

At 84, the selected images are processed to identify pore space and to identify rock matrix. Image analysis, using image analysis techniques known in the art, may also be performed to constrain parameters including image-based estimate of porosity, mean distance between pore bodies, and surface area to volume ratio of the imaged porosity. The selected images may also be used to infer the presence of anisotropy in the pore structure, and to identify and quantify non-network porosity such as vugs, molds, fractures, etc. The image-determined porosity is then subtracted from measured porosity (such as by laboratory measurement) to indicate microporosity, porosity heterogeneity, and/or missing features which may be present. Acoustic velocities and bulk densities are then used to calculate elastic constants. Measured resistivity is normalized to determine the formation resistivity factor (through an appropriate model for the particular rock type and fluid present in the pore spaces). Measured NMR distributions are then normalized to with respect to the total porosity. Any models identified as relevant to predict possible constraints are then applied. For example, a model which predicts mercury injection curves based on porosity and permeability may be applied. Any information present in the database 81 may be used to facilitate this process.

The data are then used (at A in FIG. 8) any one or more in three basic ways. First, they may be used to constrain "free parameters" at 86. The data may be used as "hard constraints" on a pore structure model, at 87, or the data may be used, at 88 as "soft constraints" on a pore structure model.

At 86, constraining free parameters may be explained as follows. For example, length scale (mean distance between nodes) can be inferred from image analysis or by applying network theory (modeled as tubular pore throats and spherical pore nodes) to porosity, permeability, and formation factor data to determine the length scale of an equivalent homogeneous network. Image processing software known in the art may be used to enable the user to specify any one or more image derived properties. Any inconsistencies between different predictions of the same parameter may be used to determine possible causes that impact the choice of free parameters and/or model variables. The user may be queried by the system to define limits of the solution space (i.e., what are the minimum and maximum size for the pore throats, what pore throat shapes are to be used, and what range of shape factors are within the solution space). The system may query the user to specify any non-network porosity types present, including attributes, volumetrics and how the non-network porosity is to be included in the pore structure inversion process. The system may query the user to choose a rheological model for the matrix material, either based on mineral composition of the matrix material or based on empirical models applied to any available data (from database in 81). The system may query the user to selected the inversion methodology to use, what to do (for example, varying or deleting certain constraints) in the event any conflicting model constraints are determined to exist, and what "soft constraints" to apply to the pore structure model after the inversion is completed.

The system may be adapted to provide the user with software tools to select individual constraints for the inversion. Constraints, as used in this description are measured properties, including petrophysical properties, of the particular Earth formation that are sensitive, either in whole or in part, to the distribution of sizes and shape factors of the pore throats (tubes 14 in FIG. 1). Constraints in the present embodiment include dynamic bulk modulus, formation factor, permeability, surface area to volume ratio, mercury injection capillary pressure properties, and NMR relaxation properties. Data used as a constraint can be pre-processed using petrophysical models known in the art to enable determining at least one pore structure constraint from data that is influenced by other effects. For example, in the case of NMR relaxometry, a model may be applied to account for microporosity diffusion effects. As another example, for mercury injection the application of percolation theory to relate the main inflection point on the capillary pressure curve as indicative of the effective radius at percolation. Constraints relating to compressional and shear acoustic velocities and the effect of fluid saturation on velocities and/or elastic moduli may also be used to determine constraints.

The system may query the user as to what soft constraints to apply after each inversion is completed. Soft constraints are any attributes or measurable properties that cannot be used as direct constraints in the inversion, but can be used for either quantitative or qualitative comparison with predictions based on the inversion results.

At 89, inversion (as explained with reference to FIGS. 3, 4 and 5) is performed to determine throat shape distribution. It should be noted that frequently a number of different throat shape distributions may be consistent with the constraining data. Using maximum entropy inversion as explained earlier herein, however, provides a unique inversion result: that which maximizes the entropy function.

At 90, if the inversion is not successful, which may occur if one or more constraints or parameters are in conflict with the underlying models, the system provides the user with the choice to stop the process, at 91, or to try to remove a constraint, at 92 and repeat the inversion, at 89. In using the maximum entropy method described above, it is preferable to remove the constraint having the largest absolute value of λ at the conclusion of the failed inversion, at 90. The inversion may then be repeated, at 89. Alternatively, the user can identify some other rationale, including personal judgment of the user, to identify a conflicting constraint or parameter before removing the constraint and repeating the inversion.

If the inversion was successful, at 90, the inversion results may then be used, at 93, to predict those petrophysical properties or attributes to be selected as soft constraints. Differences between observed parameters and predicted parameters are determined, and inversion attributes such as the entropy are then quantified. These quantities can be used as an indicator of quality or correlation of fit (or degree of correspondence) of the inversion results to the data. Note that the using inversion process described above, typically the hard constraints are fit exactly. If an alternative inversion method is used, errors with respect to hard and soft constraints can be combined to determine quality of fit.

At 94, the inversion results (both successful and unsuccessful) are tabulated and/or recorded. Optionally, the results may be written to the database 81 and/or the results may be used in one or more petrophysical applications, at 96.

In one embodiment, "parameter studies" may be performed by performing a number of inversion processed, while systematically varying some model parameters and/or constraints while holding others constant, at 95. Thus, the loop 85 through 95 is performed repeatedly. One implementation includes repeating steps 85 through 95 repeatedly, while varying a parameter, such as length scale, and using the results (such as model entropy and the errors with respect to soft constraints) to select a preferred model or group of preferred models for a given sample. In so doing, a preferred length scale is established. In some embodiments, a degree of correspondence between measured parameters and modeled parameters is determined as the constraining parameter is varied. If the degree of correspondence falls below a selected threshold, the parameter may be deleted as a constraint on the model.

While the invention has been described with respect to a limited number of embodiments, those skilled in the art, having benefit of this disclosure, will appreciate that other embodiments can be devised which do not exceed the scope of the invention as disclosed herein. Accordingly, the scope of the invention should be limited only by the attached claims.

What is claimed is:

1. A method for modeling a pore structure of porous materials, comprising:

generating an initial model of the porous material, the initial model comprising an interconnected network of passages including a first geometric shape and a second geometric shape;

calculating at least one petrophysical property from the initial model;

adjusting at least one geometric parameter of the first geometric shape of at least one passage;

recalculating the at least one petrophysical property;

repeating the adjusting and recalculating until a difference between the calculated petrophysical property and a measured petrophysical property reaches a minimum and an indeterminacy condition is satisfied; and at least one of recording and tabulating results of the repeated adjusting and calculating.

2. The method of claim 1 wherein the indeterminacy condition comprises a minimum mean size of the passages in the interconnected network.

3. The method of claim 1 wherein the indeterminacy condition comprises a maximum mean aspect ratio of the first geometric shape.

4. The method of claim 1 further comprising determining an entropy of the initial model based on the first geometric shape, and repeating the adjusting and recalculating until the entropy reaches a maximum.

5. The method of claim 1 wherein the initial model comprises average length.

6. The method of claim 5 wherein the average length is related to a geometric parameter of the second geometric shape.

7. The method of claim 6 wherein the second geometric shape comprises a sphere, and the geometric parameter of the second geometric shape comprises average radius.

8. The method of claim 1 wherein the at least one geometric parameter comprises aspect ratio.

9. The method of claim 1 wherein the at least one geometric parameter comprises a cross-sectional dimension.

10. The method of claim 1 further comprising setting the initial model to include a fractional volume of total pore space occupied by features of the first geometric shape and a fractional volume of features occupied by the second geometric shape.

11. The method of claim 1 wherein the first geometric shape comprises tubes.

12. The method of claim 1 wherein the second geometric shape comprises spheres.

13. The method of claim 1 wherein the second geometric shape is adapted to have substantially no effect on transport properties of the Earth formation.

14. The method of claim 13 wherein the transport properties comprise at least one of fluid permeability and formation resistivity factor.

15. The method of claim 1 wherein the at least one petrophysical property comprises at least one of nuclear magnetic resonance relaxation distribution, formation resistivity factor, fluid permeability, mercury injection capillary pressure, compressional wave acoustic velocity and shear wave acoustic velocity.

16. The method of claim 1 further comprising adding pore space to the initial model, the added pore space comprising voids which are modeled as substantially separate from the network of interconnected passages, the voids substantially not in hydraulic communication with each other.

17. The method of claim 16 wherein the adjusting comprises changing an amount of the additional porosity.

18. The method of claim 1 further comprising adding pore space to the initial model, added pore space comprising a second network of interconnected passages, the second network substantially separate from the network of interconnected passages including the first and second geometric shapes.

19. The method of claim 18 wherein the second network of passages comprises the first geometric shape, and the adjusting comprises at least one of changing amount of the additional porosity and changing at least one geometric parameter of the first geometric shape in the second network.

20. The method of claim 1 further comprising:
varying the at least one petrophysical property;
repeating the generating an initial model of the Earth formation, repeating the calculating at least one petrophysical property from the initial model, repeating the adjusting at least one geometric parameter of the first geometric shape of at least one passage, repeating the recalculating the at least one petrophysical property, repeating the adjusting and recalculating until a difference between the calculated petrophysical property and a measured petrophysical property reaches a minimum; and
determining a degree of correspondence between the varied petrophysical property, and the calculated petrophysical property.

21. The method of claim 20 further comprising removing the at least one petrophysical property as a constraint on the initial model and the adjusted model if the degree of correspondence falls below a selected threshold.

22. The method of claim 1 further comprising:
varying at least one model parameter;
repeating the generating an initial model of the Earth formation, repeating the calculating at least one petrophysical property from the initial model, repeating the adjusting at least one geometric parameter of the first geometric shape of at least on passage, repeating the recalculating the at least one petrophysical property, repeating the adjusting and recalculating until a difference between the calculated petrophysical property and a measured petrophysical property reaches a minimum; and
determining a degree of correspondence between the at least one petrophysical property, and the calculated petrophysical property.

23. A computer program stored in a computer readable medium, the program having logic operable to cause a programmable computer to perform steps comprising:
generating an initial model of a porous material, the initial model comprising an interconnected network of passages including a first geometric shape and a second geometric shape;
calculating at least one petrophysical property from the initial model;
adjusting at least one geometric parameter of the first geometric shape of at least one passage;
recalculating the at least one petrophysical property;
repeating the adjusting and recalculating until a difference between the calculated petrophysical property and a measured petrophysical property reaches a minimum and an indeterminacy condition is satisfied; and
at least one of recording and tabulating results of the repeated adjusting and calculating.

24. The computer program of claim 23 wherein the indeterminacy condition comprises a minimum mean size of the passages in the interconnected network.

25. The computer program of claim 23 wherein the indeterminacy condition comprises a maximum mean aspect ratio of the first geometric shape.

26. The computer program of claim 23 further comprising logic operable to cause the computer to perform determining an entropy of the model based on the first geometric shape, and repeating the adjusting and recalculating until the entropy reaches a maximum.

27. The computer program of claim 23 wherein the initial model comprises average length.

28. The computer program of claim 27 wherein the average length is related to a geometric parameter of the second geometric shape.

29. The computer program of claim 28 wherein the second geometric shape comprises a sphere, and the geometric parameter of the second geometric shape comprises average radius.

30. The computer program of claim 23 wherein the at least one geometric parameter comprises aspect ratio.

31. The computer program of claim 23 wherein the at least one geometric parameter comprises and cross-sectional dimension.

32. The computer program of claim 23 further comprising logic operable to cause the computer to perform setting the initial model to include a fractional volume of total pore space occupied by features of the first geometric shape and a fractional volume of features occupied by the second geometric shape.

33. The computer program of claim 23 wherein the first geometric shape comprises tubes.

34. The computer program of claim 23 wherein the second geometric shape comprises spheres.

35. The computer program of claim 23 wherein the second geometric shape is adapted to have substantially no effect on transport properties of the porous material.

36. The computer program of claim 35 wherein the transport properties comprise at least one of fluid permeability and formation resistivity factor.

37. The computer program of claim 23 wherein the at least one petrophysical property comprises at least one of nuclear magnetic resonance relaxation distribution, formation resistivity factor, fluid permeability, mercury injection capillary pressure, compressional wave acoustic velocity and shear wave acoustic velocity.

38. The computer program of claim 23 further comprising logic operable to cause the computer to perform adding pore space to the initial model, the added pore space comprising voids which are substantially separate from the network of interconnected passages, the voids substantially not in hydraulic communication with each other.

39. The computer program of claim 38 wherein the adjusting comprises changing an amount of the additional porosity.

40. The computer program of claim 23 further comprising logic operable to cause the computer to perform adding pore space to the initial model, added pore space comprising a second network of interconnected passages, the second network substantially separate from the network of interconnected passages including the first and second geometric shapes.

41. The computer program of claim 40 wherein the second network of passages comprises the first geometric shape, and the adjusting comprises at least one of changing amount of the additional porosity and changing at least one geometric parameter of the first geometric shape in the second network.

42. The computer program of claim 23 further comprising logic operable to cause the computer to perform:
varying the at least one petrophysical property;
repeating the generating an initial model of the porous material, the initial model comprising an interconnected network of passages including a first geometric shape and a second geometric shape, repeating the calculating at least one petrophysical property from the initial model, repeating the adjusting at least one geometric parameter of the first geometric shape of at least one passage, repeating the recalculating the at least one petrophysical property, repeating the adjusting and recalculating until a difference between the calculated petrophysical property and a measured petrophysical property reaches a minimum; and
determining a degree of correspondence between the varied petrophysical property and the calculated petrophysical property.

43. The computer program of claim 42 further comprising logic operable to cause the computer to remove the at least one petrophysical property as a constraint on the initial model and the adjusted model if the degree of correspondence falls below a selected threshold.

44. The computer program of claim 23 further comprising logic operable to cause the computer to perform:
varying at least one model parameter;
repeating the generating an initial model of the porous material, repeating the calculating at least one petrophysical property from the initial model, repeating the adjusting at least one geometric parameter of the first geometric shape of at least one passage, repeating the recalculating the at least one petrophysical property, repeating the adjusting and recalculating until a difference between the calculated petrophysical property and a measured petrophysical property reaches a minimum; and
determining a degree of correspondence between the at least one petrophysical property and the calculated petrophysical property.

* * * * *